United States Patent [19]
Okamoto et al.

[11] Patent Number: 5,902,929
[45] Date of Patent: May 11, 1999

[54] METHOD FOR DISCRIMINATING TIRE TYPE

[75] Inventors: Tsutomu Okamoto, Otsu, Japan; Hyung Hwan Do; Yang Kyu Lee, both of Taejon, Rep. of Korea

[73] Assignees: OMI Weighing Machine Inc., Shiga, Japan; Hankook Tire Mfg. Co., Ltd, Seoul, Rep. of Korea

[21] Appl. No.: 09/022,618

[22] Filed: Feb. 12, 1998

[30] Foreign Application Priority Data

Feb. 13, 1997 [JP] Japan ................................ 9-042848

[51] Int. Cl.⁶ .............................................. G01M 17/02
[52] U.S. Cl. ................................................ 73/146
[58] Field of Search ................ 356/139.09; 250/568; 379/191, 269, 284; 73/146

[56] References Cited

U.S. PATENT DOCUMENTS 3,630,007 12/1971 Boileau .................................. 73/146
4,443,663 4/1984 Ellis et al. ............................. 379/191

*Primary Examiner*—William Oen
*Attorney, Agent, or Firm*—Hardaway Law Firm, P.A.

[57] ABSTRACT

There is provided a method for discriminating a tire class which can improve discrimination grade of the tire class by detecting error of decoding, in case the decoding of a character is erroneous. A train of symbols is composed of a multiple arrangement of discrimination symbols, and the discrimination symbols are composed of a character code portion that is indicated according to existence of a length and breadth, and a parity check porion indicating truth and falsity of said character code portion with existence of multiple dots. A CCD camera photographs a train of symbols, and the train of symbols in the photograph is made of two dimensional image data; according to a control unit, the existence of each discrimination symbol dot at the train of symbols of the image data is recognized, and the character code is decoded due to the length and breadth arrangement of the character code portion of the discrimination symbols. Simultaneously, the truth or falsity of a decoded result of the character code is judged by arrangement of the parity check portion dot of said discrimination symbols.

1 Claim, 14 Drawing Sheets

| Symbols | 1 | 2 | 3 | 4 |
|---|---|---|---|---|
| Discrimination Symbols | ●○ ○○ ○○ ○● | ●○ ●○ ○○ ●● | ●○ ●○ ●○ ○● | ○● ○○ ○○ ●○ |
| Reading code | 10010 | 11020 | 11130 | 10001 |
| Parity check | 11 | 31 | 31 | 11 |

| Symbols | 5 | 6 | 7 | 8 |
|---|---|---|---|---|
| Discrimination Symbols | ○● ○● ○○ ●● | ○● ○● ○● ●○ | ●● ○○ ○○ ○○ | ●● ●○ ○○ ●○ |
| Reading code | 11002 | 11103 | 20011 | 21021 |
| Parity check | 13 | 13 | 11 | 31 |

| Symbols | 9 | 0 |
|---|---|---|
| Discrimination Symbols | ●● ●○ ●○ ○○ | ●● ●● ○○ ●● |
| Reading code | 21131 | 22022 |
| Parity check | 31 | 33 |

| Symbols | 1 | 2 | 3 | 4 |
|---|---|---|---|---|
| Discrimination Symbols | ●○ ○○ ○○ ○● | ●○ ●○ ○○ ●● | ●○ ●○ ●○ ○● | ○● ○○ ○○ ●○ |
| Reading code | 10010 | 11020 | 11130 | 10001 |
| Parity check | 11 | 31 | 31 | 11 |

| Symbols | 5 | 6 | 7 | 8 |
|---|---|---|---|---|
| Discrimination Symbols | ○● ○● ○○ ●● | ○● ○● ○● ●○ | ●● ○○ ○○ ○○ | ●● ●○ ○○ ●○ |
| Reading code | 11002 | 11103 | 20011 | 21021 |
| Parity check | 13 | 13 | 11 | 31 |

| Symbols | 9 | 0 |
|---|---|---|
| Discrimination Symbols | ●● ●○ ●○ ○○ | ●● ●● ○○ ●● |
| Reading code | 21131 | 22022 |
| Parity check | 31 | 33 |

FIG. 6

| Symbols | A | B | C | D |
|---|---|---|---|---|
| Discrimination Symbols | ○○<br>○○<br>●○<br>○● | ○○<br>●○<br>●○<br>●● | ○○<br>●○<br>●●<br>●○ | ○○<br>●●<br>●●<br>●● |
| Reading code | 00110 | 01120 | 01221 | 02222 |
| Parity check | 11 | 31 | 31 | 33 |

| Symbols | E | F | G | H |
|---|---|---|---|---|
| Discrimination Symbols | ●○<br>●○<br>●●<br>○○ | ●●<br>●●<br>●●<br>●○ | ○●<br>○●<br>●●<br>○○ | ○○<br>○○<br>●●<br>○○ |
| Reading code | 11231 | 22132 | 11213 | 00211 |
| Parity check | 31 | 33 | 13 | 11 |

| Symbols | I | J | K | L |
|---|---|---|---|---|
| Discrimination Symbols | ○○<br>○●<br>●●<br>○● | ○●<br>●●<br>●●<br>●○ | ●○<br>○○<br>●●<br>●○ | ●○<br>○●<br>●●<br>●○ |
| Reading code | 01212 | 12223 | 10120 | 11121 |
| Parity check | 13 | 33 | 31 | 31 |

FIG. 7

| Symbols | M | N | O | P |
|---|---|---|---|---|
| Discrimination Symbols | | | | |
| Reading code | 10212 | 01011 | 11011 | 11112 |
| Parity check | 13 | 11 | 11 | 13 |

| Symbols | Q | R | S | T |
|---|---|---|---|---|
| Discrimination Symbols | | | | |
| Reading code | 12113 | 12131 | 21012 | 12122 |
| Parity check | 13 | 31 | 13 | 33 |

| Symbols | U | V | W | X |
|---|---|---|---|---|
| Discrimination Symbols | | | | |
| Reading code | 10221 | 12232 | 02011 | 20222 |
| Parity check | 31 | 33 | 11 | 33 |

FIG. 8

| Symbols | Y | Z | - | Space |
|---|---|---|---|---|
| Discrimination Symbols | | | | |
| Reading code | 21223 | 11222 | 21113 | 22233 |
| Parity check | 33 | 33 | 13 | 33 |

| Symbols | / |
|---|---|
| Discrimination Symbols | |
| Reading code | 10102 |
| Parity check | 13 |

METHOD FOR DISCRIMINATING TIRE TYPE

BACKGROUND OF THE INVENTION

The present invention relates to a method for discriminating a tire class, that is discriminating a tire type based on a train of symbols installed in the side of the tire.

A class recognition label for classifying tire type is attached on manufactured tires. Namely a coded numeral, a character, or numeral concavely shaped is attached on the tire, and many methods and apparatus for automatically decoding a recognition label of class attached on the tire have been proposed.

For example, a method for discriminating a tire type comprising of micro projections corresponding to signal indicates a tire type in which the tire bead hill portion is the best in dimension and is the best plane surface among the portions of the tire along the circumference of the tire, and detecting projections by contact or noncontact manner; converting the detected signal to a digital signal; then discriminating tire type by comparing the digital signal with a predetermined signal corresponding to the tire type, is proposed in the Japanese patent publication sho 55-83965.

Also, a method for discriminating tire type with the following method that forms a discriminating bar concave or convex shape at the side wall of the tire radially along its circumferential direction, wherein said discriminating bar provides regularity per tire type, then scans with a sensor at the prominence and depression of the discriminating bar and detects, is proposed in the Japanese patent. publication sho 58-72439.

Moreover, a method for automatically discriminating tire type comprising: a step detecting with detecting arm a position of the mark portion pre-provided at some position having certain relation to a train of symbols that is composed of the character or numeral installed concave or convex shaped in the side wall of tire; a step positioning at a readable position of train of symbols by directly moving a read arm of the character or numeral etc. with the moving read arm based on the output signal from position detecting arm; a step the reading the character or numeral of train of symbols by read arm; a step discriminating the character, or numeral of train of symbols by discriminating the arm based on the output signal from the read arm, is proposed in the Japanese patent publication sho 61-43382.

This forms a character or numeral indicating discrimination of the tire with an inversed V shape, thereby clearing contrast against the background of a character or numeral, while it uses an one dimensional image sensor as read unit and performs a scan by scanning signal with fixed frequency, and inputs a two-division one dimensional image signal in that the background region is black and symbol region is white as a buffer, and provides conclusively a two dimensional image signal. To discriminate said two dimensional image signal is to judge the tire class.

Thus, it is possible to use dot code as a train of symbols indicating a class of the tire. Also, a unit for reading automatically a dot code, for example unit for decoding dot code document, photographic optically colored region with dot code and discriminating between convexed dot and concaved dot based on the photographic image data, thereby converts dot code to KANA(Japanese alphabet), is disclosed in the Japanese patent publication hei 7-234632.

However, if dust is attached to a position where a dot does not initially exist, the dust is recognized as a dot. Subsequently, because of decoding into a wrong character, that results in erroneous discrimination.

SUMMARY OF THE INVENTION

The object of the present invention is to provide a method for discriminating tire class and improving a degree of discrimination of the tire class by detecting a erroneous decoding if decoding of character is in error.

A method for discriminating tire class according to the present invention is to discriminate tire class to solve said conventional problems based on a train of symbols installed in the side of the tire. Also, it is characterized that the train of symbols is composed of a multiple arrangement of the discrimination symbols. and the discrimination symbols are composed of a character code portion that is indicated according to existence of a length and breadth, and a parity check porion that indicates truth and falsity of said character code portion with existence of multiple dots; a CCD camera photographic train of symbols and the photographic train of symbols are made of two dimensional image data; according to a control unit, the existence of each discrimination symbol dot at the train of symbols of the image data is recognized, and the character code is decoded due to the length and breadth arrangement of the character code portion of discrimination symbols, simultaneously the truth and falsity of decoded result of the character code, which is decoded by arrangement of the parity check portion dot of said discrimination symbols, is judged.

DESCRIPTION OF THE DRAWINGS

FIG. 6 illustrates a portion of said discrimination symbols used in the embodiment, reading code of discrimination symbols, and reading results of a the parity check.

FIG. 7 illustrates a portion of said discrimination symbols used in the embodiment, reading code of discrimination symbols, and reading results of the parity check.

FIG. 8 illustrates a portion of said discrimination symbols used in the embodiment, reading code of discrimination symbols, and reading results of the parity check.

DESCRIPTION OF THE PREFERRED EMBODIMENT

The embodiments of the present invention will be described with reference to the drawings.

Figure 1:
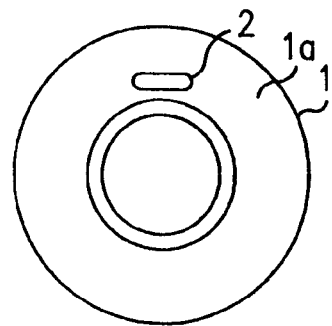
FIG. 1 illustrates a plane view of a tire according to the present invention.
Figure 2:
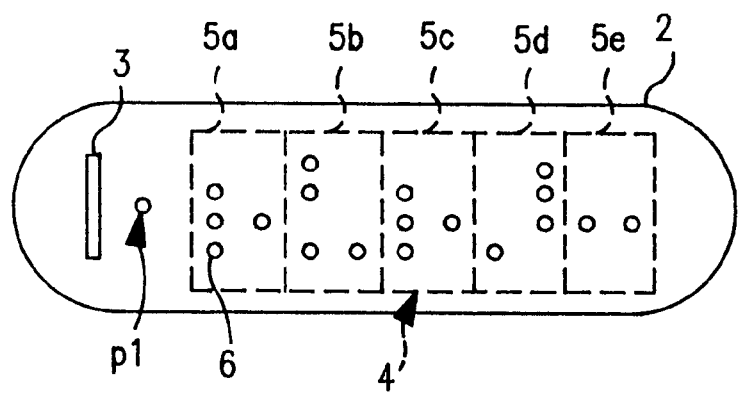
FIG. 2 illustrates a magnified view of a mark portion of the tire.
Figure 3:
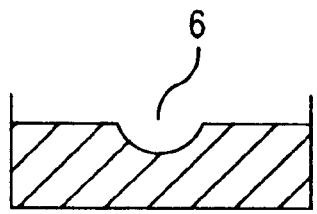
FIG. 3 illustrates a cross-sectional view of dots installed in saidmark portion of the tire.

FIG. 1 is a plane view of the tire according to an embodiment of the present invention. A mark portion(2) is installed in a side wall(1a) of the tire(1). FIG. 2 is a magnified view of the mark port ion(2) of the tire. A laser mark(3) is provided near the left side of the mark portion(2) toward the breadth direction of the mark portion(2) and a reference dot(P1) is formed at the right side of the laser mark(3), and a train of symbols(4) is formed near the right side of the mark portion(2) from the right side of the corresponding reference dot(P1). The train of symbols is composed of a multiple arrangement of the discrimination symbols. Also, in the present embodiment, the train of symbols is composed of five arrangements of the discrimination symbols(5a~5e). Also, each of the discrimination symbols(5a~5e) is designated by the existence of a dot(6) at the each arrangement position of length and breadth of the four rows in two columns. FIG. 3 is a sectional view of the dot(6) and, as shown in FIG. 3, each dot(6) is formed by a circular concaved portion.

Figure 4:
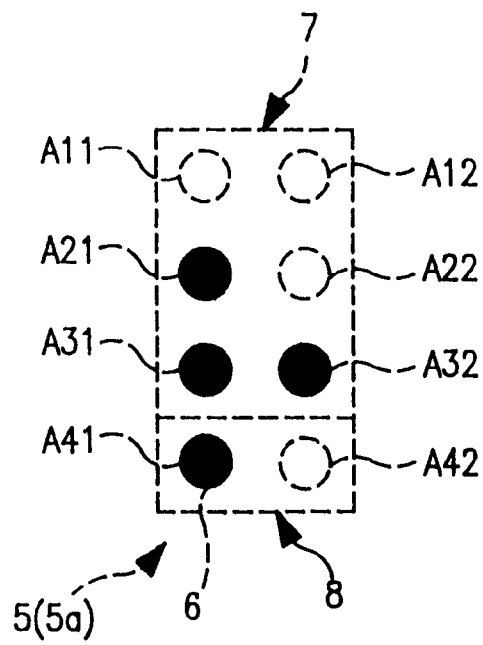
FIG. 4 illustrates a front view of discrimination symbols installed in said mark portion of the tire.

FIG. 4 is a front view of discrimination symbols(5). Also, FIG. 4 illustrates the discrimination symbols(5a) as an example. As shown in FIG. 4, the discrimination symbols(5) are set by the length and breadth of four rows in two columns, i.e., all eight arrangements are positioned as illustrated in code(A11~A42).

The discrimination symbols(5) are composed of a character code portion(7) in which a dot code is designated according to existence of the dot(6) of three rows in two columns of first row to third row, namely arrangement position(A11, A12, A21, A22, A31, A32), and a parity check portion(8) in which the truth and falsity of the character code portion(7) is designated by existence of dot first row in two columns of fourth row, namely arrangement position(A41, A42). Also, in FIG. 4, because the dot(6) is installed in arrangement position(A21, A31, A32) of the character code portion(7), the character code is designated as an alphabetical character [C], and because the dot(6) is installed in arrangement position(A41) of the parity check portion(8), the truth and falsity of the alphabetical character [C] designated in the character code portion(7) is designated.

Figure 5:
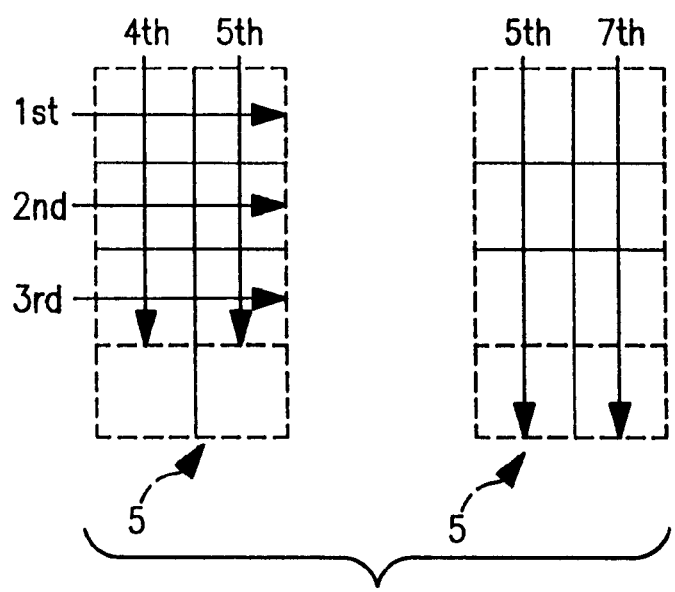
FIG. 5 illustrates a reading sequence of said discrimination symbols.

FIG. 5 illustrates a reading sequence of the discrimination symbols. As shown in FIG. 5 the existence of the dot(6) of the character code portion(7) of the discrimination symbols(5) is read. Firstly, device reads the first row of the discrimination symbols(5), namely reads the arrangement position (A11, A12), then counts the number of the dot(6). In the embodiment illustrated in FIG. 4, because the dot(6) does not exist in the arrangement position(A11)(A12), a reading result is 0. Similarly, device reads the second row and third row in sequence. In the embodiment illustrated in FIG. 4, because the dot(6) does not exist in the arrangement position (A22) but in the arrangement position(A21), a reading result of the second row is 1. Also if, the dot(6) exists in both arrangement positions(A31)(A32), a reading result of the third row is 2.

Next, device reads the first column of the character code portion(7) of the discrimination symbols(5). Namely, device reads the arrangement positions(A11, A21, A31) and counts the number of the dot(6). In the embodiment illustrated in FIG. 4, because the dot(6) does not exist in the arrangement position(A11) but in the arrangement position(A21)(A31), a reading result of the first column of the character portion(7) is 2. Similarly, device reads the second column of the character code portion(7) of the discrimination symbols(5). In the embodiment illustrated in FIG. 4, because the dot(6) does not exist in the arrangement position(A12)(A22) but in the arrangement posit ion(A32), a reading result of the second column of the character portion(7) is 1. As described above, device reads a dot code marked at the character code portion(7) of the discrimination symbols(5). In the embodiment illustrated in FIG. 4, a reading result of the dot code marked at the character code portion(7) is reading code [01221].

Next, device reads existence of the dot(6) of the first column of the discrimination symbols(5) comprising parity check portion(8), and then reads existence of the dot(6) of the second column of the discrimination symbols(5) comprising parity check portion(8). Namely, device reads the arrangement position(A11, A21. A31, A41) of the discrimination symbols(5) and counts the number of the dot(6). Then, device reads the arrangement position(A12, A22, A32, A42) of the discrimination symbols(5). Also, existence of the dot of the arrangement position(A41)(A42) of the parity check portion(8) is composed of odd parity which. means a count result of dot numeral must be odd, i.e., 1 or 3.

In the embodiment illustrated in FIG. 4, because the dot(6) does not exist in the arrangement position(A11) but in the arrangement position(A21, A31, A41), a reading result of the first column of the discrimination symbols(5) is 3. And, because the dot(6) exists in the arrangement position (A32), a reading result of the second column of the discrimination symbols(5) is 1. Conclusively, the reading result of the parity check is [31].

Also, in the present embodiment, the discrimination symbols(5) use a dot code indicated in the character code portion(7) of it, wherein said dot code designates numerals 0~9, alphabetical character A~Z, symbol [-], [/], and space. Also, FIG. 6 to FIG. 9 illustrate discrimination symbols and a reading code of them, and a reading result comparing the parity check portion(8). Also, the discrimination symbols (5a~5e) of a train of symbols illustrated in FIG. 2 designate what a tire type is [C 2 C 2 H].

Figure 9:
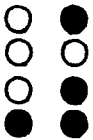
FIG. 9 illustrates a portion of said discrimination symbols used in the embodiment, reading code of discrimination symbols, and reading results of the parity check.
Figure 10:
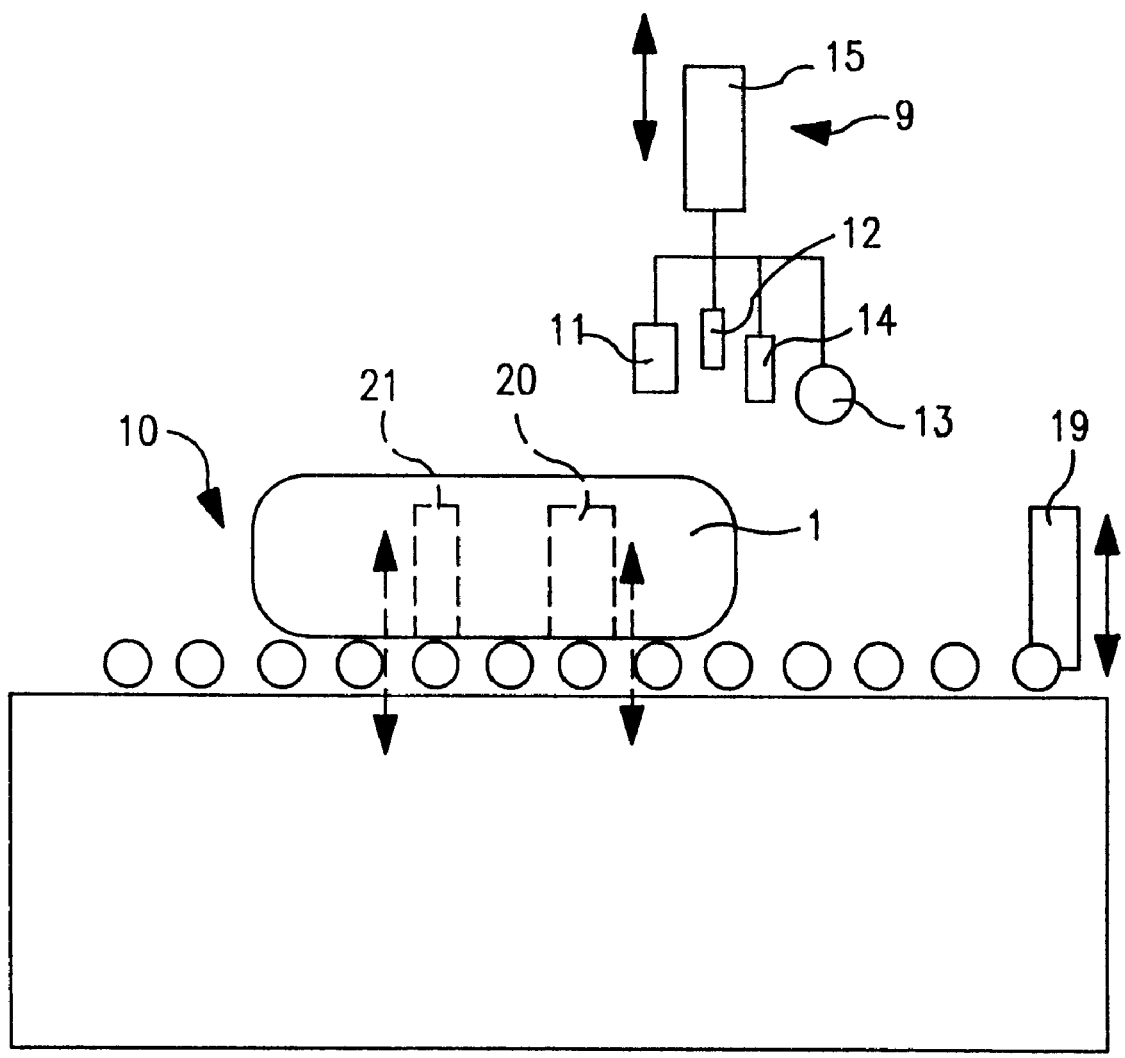
FIG. 10 illustrates a photographic portion which is a class discrimination unit for discriminating tire class of the embodiment and a circle portion of a side of the trie.
Figure 11:
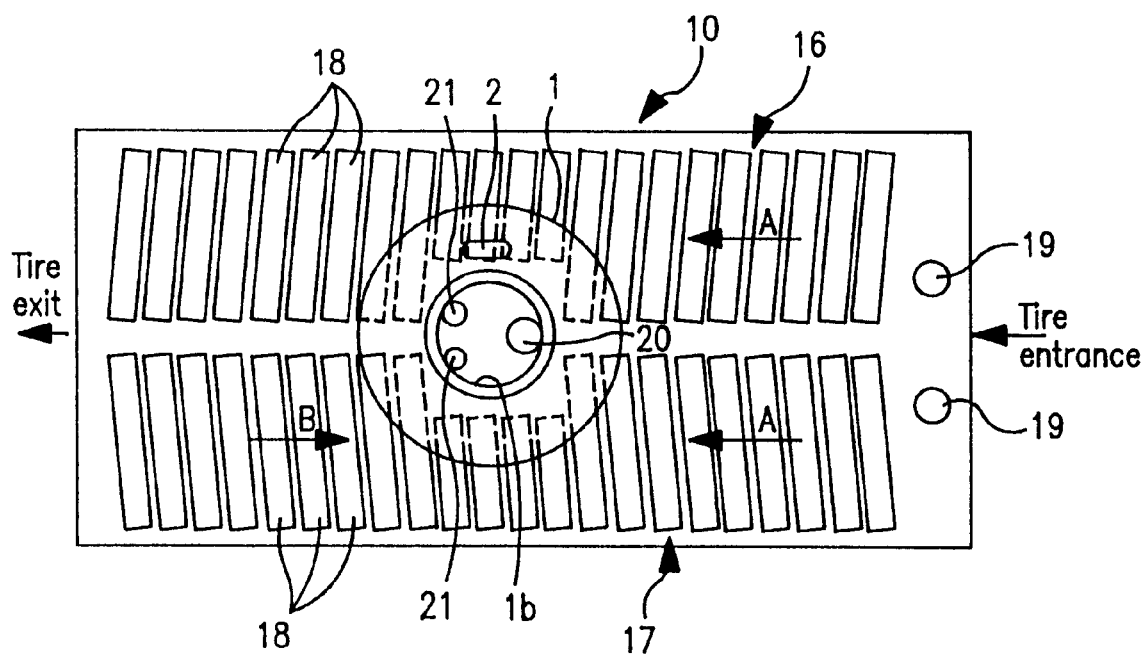
FIG. 11 illustrates a plane view of the circle portion of the tire.

FIG. 10 is a side elevational view diagrammatically illustrating a photographic portion(9) which is a class discrimination unit for discriminating tire class and the circle portion of tire(10). Also, FIG. 11 is a plane view of the circle portion of tire(10). As shown in FIG. 9, the photographic portion(9) is provided with the CCD camera(11) which is installed on the top of the circle portion of tire(10) and photographs the mark port ion(2) illustrated in FIG. 2, and the laser senser(12) for detecting a laser mark of the mark portion(2) illustrated in FIG. 2, and the illumination light (13) for illuminating, and the ultrasonic sensor(14) for measuring distance between top of sidewall of the tire installed on the circle portion of tire(10) and CCD camera (11), and the servo drive cylinder(15) which moves up and down the CCD camera(11), the laser sensor(12), the illumination light(13), and the ultrasonic sensor(14).

As shown in FIG. 11, the circle portion of tire(10) is provided with the first drive roller conveyor(16) and the second drive roller conveyor(17) for transfer purpose during entrance and detection of the tire, and circulation of the tire within the photographing position of the CCD camera. Also, in FIG. 11, the tire(1) enters at the right side of circle portion of tire(10) and exists at the left side of circle portion of tire(10).

As shown in FIG. 11, the first drive roller conveyor(16) is installed parallel with the second drive roller conveyor(17) along the transfer direction of the tire(1), and the first drive roller conveyor(16) is installed in the right side transfer direction of the tire(1); the second drive roller conveyor(17) is installed in the left side for transfer direction of the tire(1). The first drive roller conveyor(16) and the second drive roller conveyor(17) have a plurality of rollers installed at a slant so that the bottom is not at the one side located at the outside of each but the other side located centrally for transfer direction of a tire Also, in FIG. 11, near the right side of the circle portion of tire(10) in which the tire(1) enters, the first stoppers(19, 19) are installed at the right and left in the transfer direction, respectively. Also, as shown in FIG. 10, the first stoppers(19, 19) are installed to allow entrance and exit simultaneously for transfer face of the first drive roller conveyor(16) and second drive roller conveyor(17).

As shown in FIG. 10 and FIG. 11, the second stopper(20), which sets the tire(1) in the photographing position of the CCD camera, is installed at the center of the circle portion of tire(10), and when the tire(1) circles, two guide rollers(21. 21) are installed. The second stopper(20) and two guide rollers(21, 21) are installed to allow entrance and exit simultaneously for transfer face of the first drive roller conveyor(16) and second drive roller conveyor(17).

Figure 12:
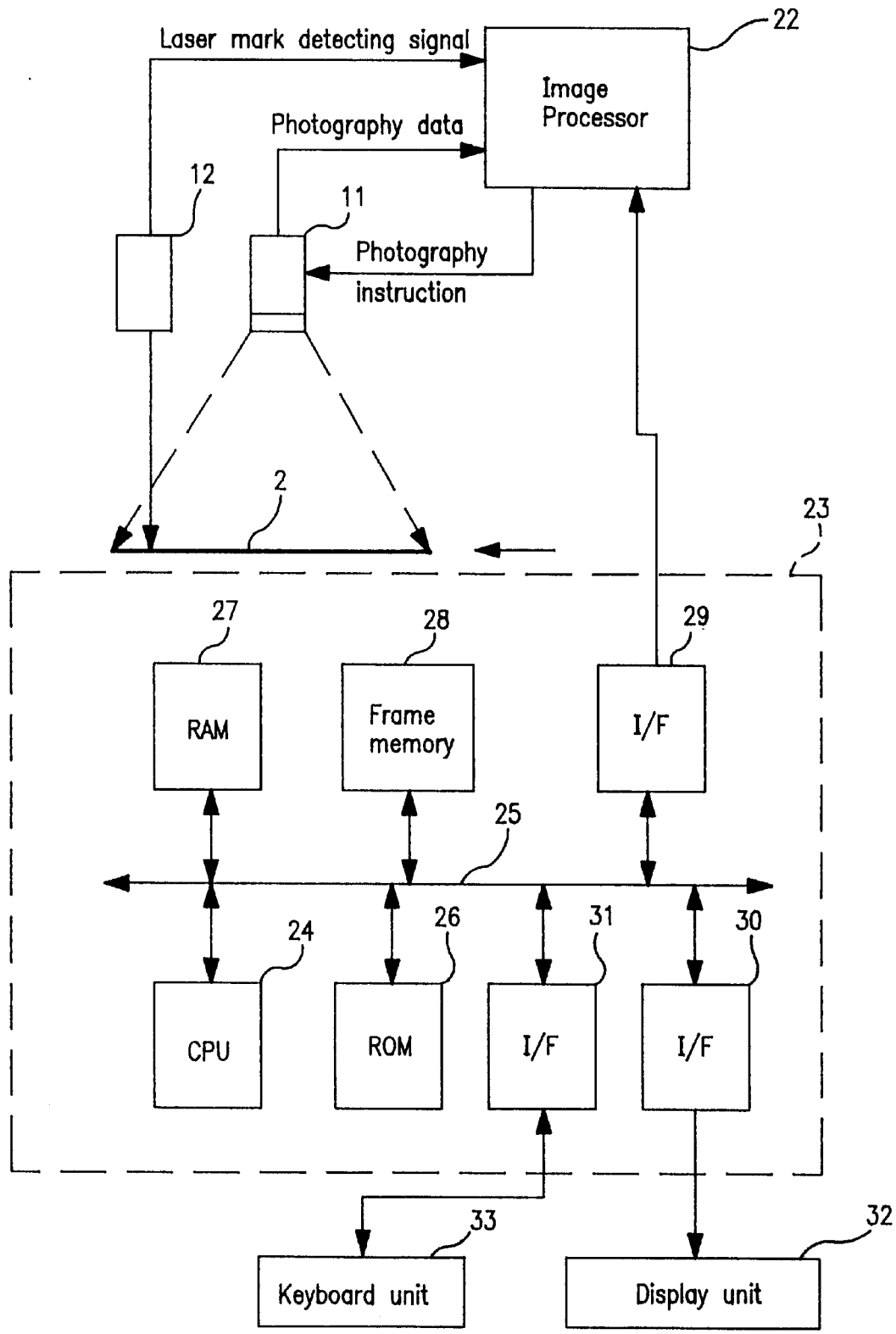
FIG. 12 is a main block diagram illustrating control system of the class discrimination device.

Next, the present invention will describe a control system for discriminating the class of the tire(1). FIG. 12 is main block diagram illustrating control system which is a class discrimination device. As shown in FIG. 12, the laser sensor(12) for detecting the laser mark(3)(see FIG. 2) of the mark portion(2) and the CCD camera for taking a photograph of the mark portion(2) is connected to the image processor(22), and the image processor(22) is connected to the control system(23) for enabling communication.

The CPU(24) of the control system(23) is connected to the ROM(26) in which a control program is stored for performing the CPU(24) through the internal bus(26), the RAM(27) which enables reading and writing of sequential data, the frame memory(28) which writes image data of the mark port ion(2) received from the image processor(22), and the interface(29)(30)(31) for performing communication with the image processor(22), respectively.

Also, the CPU(24) receives image data of the mark portion(2) sent from the image processor(22) through the interface(29), and writes them to the frame memory(28). Also, the CPU(24) is connected to the display unit(32) through the interface(30) and connected to the keyboard unit(33) through the interface(31).

Also, the control program stored in the ROM(26) comprises a program that recognizes each dot(6) of each of the discrimination symbols(5a~5e) at a train of signals of image data of the mark portion(2) received from the image processor(22), and decodes a dot code(character code) by arrangement of the length and breadth dot of the character code portion(7) of the discrimination symbols(5a~5e), then discriminates truth and falsity of decoding result of character code decoded by arrangement of the dot(6) which is the parity check portion(8) of the discrimination symbols (5a~5e).

Next, the present invention will describe conduction of photographing by the CCD camera(11) which is a mark portion(2) of the tire(1) with reference to FIG. 10 to FIG. 12. In FIG. 10 and FIG. 11, before the tire(1) enters in the circle portion of tire(10), the first stoppers(19, 19) are projected above transfer face of the first drive roller conveyor(16) and the second drive roller conveyor(17), and the second stopper (20) and the guide rollers(21, 21) are projected below transfer face of the first drive roller conveyor(16) and the second drive roller conveyor(17). Also, in FIG. 11, the first drive roller conveyor(16) and the second drive roller conveyor(17) perform a rotation operation in the transfer illustrated by the direction of arrow A.

Due to a carrier arm(not illustrated), the tire(1) is transferred from the right side of FIG. 10 and FIG. 11 to the circle portion of tire(10). Then, the tire(1) contacts. with the first stoppers(19, 19) of the circle portion of tire(10). Once the tire(1) contacts with the first stoppers(19, 19), a drive arm(not illustrated) is operated, and the first stoppers(19, 19) move below transfer face of the first drive roller conveyor (16) and the second drive roller conveyor(17). And the tire(1) goes through top side of the first stoppers(19, 19), is then carried on the circle portion of tire(10), as in FIG. 11, at the left side. Also, when the tire(1) goes through top side of the first stoppers(19, 19), the state in which the first stoppers(19, 19) are projected above transfer face of the first drive roller conveyor(16) and the second drive roller conveyor(17) returns.

The tire(1), carried on the circle portion of tire(10), as in FIG. 11, at the left side, then arrives at the second stopper (20). Once carrying tire(1) arrives at the second stopper(20), drive arm(not illustrated) is driven and the second stopper (20) projects above transfer face of the first drive roller conveyor(16) and the second drive roller conveyor(17), thereby entering the inside of a center circular hall(1b) of the tire(1), and thus the carrying state of the tire(1) is stopped.

Then, by operation of the drive arm(non illustrated), the guide rollers(21, 21) are projected above transfer face of the first drive roller conveyor(16) and the second drive roller conveyor(17), thereby projecting into the inside of a center circular hall(1b) of the tire(1), and thus a roller face makes contact with the interior circumference of the circular hall (1b). At this time, the first drive roller conveyor(16) and the second drive roller conveyor(17) stop rotation drive.

As shown in FIG. 10, the tire(1) is stopped at a photographing position on the circle portion of tire(10) according to the photographic port ion(9) by means of the second stopper(20) and the guide rollers(21, 21). Once rotation drive of the first drive roller conveyor(16) and the second drive roller conveyor(17) are stopped, a distance between top of sidewall of the tire installed in photographing position and CCD camera(11) is measured. This measured distance is compared with a predetermined distance, for example 200 mm, and the servo drive cylinder(15) is driven so that the measured distance according to the ultrasonic sensor(14) and the predetermined. distance is equal. And, if the ultrasonic sensor(14), the CCD camera(11), the laser sensor(12) and the illumination light(13) are moved up and down, and the measured distance according to the ultrasonic sensor(14) and predetermined distance is equal, so the drive of servo drive cylinder(15) is stopped.

If the drive of servo drive cylinder(15) is stopped, the first drive roller conveyor(16) rotates to the right in the direction illustrated by arrow A in FIG. 11, the second drive roller conveyor(17) rotates inversely in the direction illustrated by arrow B in FIG. 11. Accordingly, the guide rollers(21, 21) are rotated by sliding in contact with the interior circumference of the circular hall(1b), thereby the tire(1) installed in photographing position rotates in the counter clockwise direction illustrated by arrow C in FIG. 11 by guiding the circular hall(1b) to the second stopper(20) and guide rollers (21, 21). The mark portion of tire(2) revolves in the counter clockwise direction around the surroundings of rotational axis by rotation of the tire(1).

As shown in FIG. 12, the mark portion(2) of the tire(1) avoids rotation in the counter clockwise direction around the surroundings of rotational axis, then passes through below the laser sensor(12) and the CCD camera(11). And, when the laser mark(3) illustrated in FIG. 2 passes through detecting position of the laser sensor(12), the laser sensor(12) detects the laser mark(3).

As shown in FIG. 12, a laser mark detecting signal is input from the laser sensor(12) to the image processor(22), and according to the laser mark detecting signal, the image processor(22) outputs photography instruct ion to the CCD camera(11), then writes photography data of the mark portion(2) according to the CCD camera(11) to the frame memory(not illustrated) as two dimensional image data. As indicated above, photography by the CCD camera(11) of the mark port ion(2) of the tire(1) is performed.

Also, photography data of the mark portion(2) written by the image processor(22) are converted into two-divided black and white image data according to certain position by the image processor(22). Also, in the black and white data in FIG. 2 the dot(6), the reference point(P1), and the laser mark(3) are recognized as black image data, and outside region of inside of the mark portion(2) is recognized as white image data.

Then, the image processor(22) transfers black and white image data for the control system(23). The control system (23) receives black and white image data of the mark port ion(2) sent from the image processor(22), and recognizes existence of each of the discrimination symbols(5a~5e) dot in train of symbols(4) of this image data, decodes a character code by arrangement of a length and breadth dot of the character code portion(7) of the discrimination symbols(5), then discriminates truth and falsity of a decoding result of the character code decoded by arrangement of dot which is the parity check portion(8) of the discrimination symbols(5).

Figure 13:
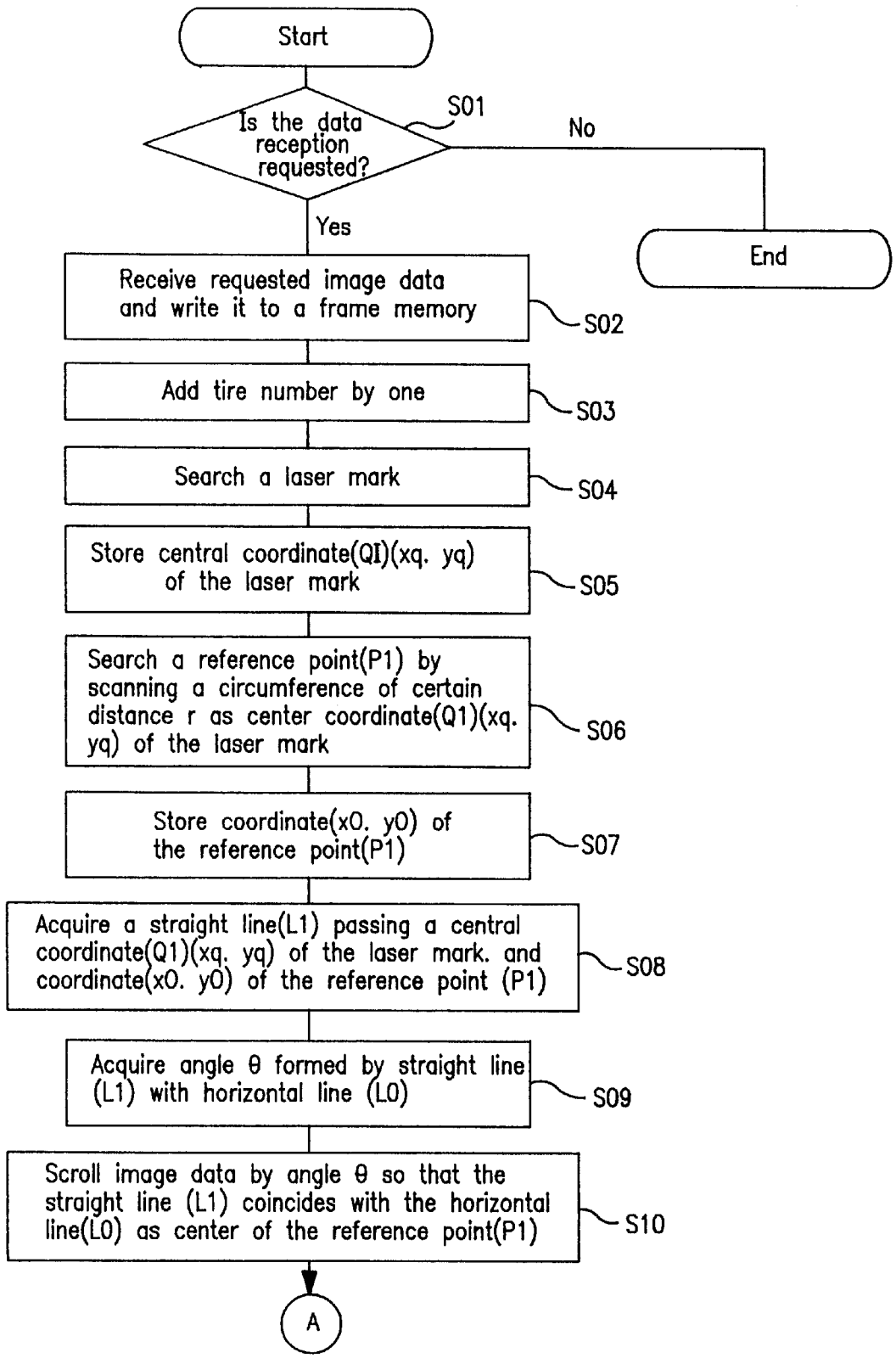
FIG. 13 a flowchart illustrating a portion of a class discrimination processing of the tire, which is carried out by CPU arranged at control system of the class discrimination unit.
Figure 14:
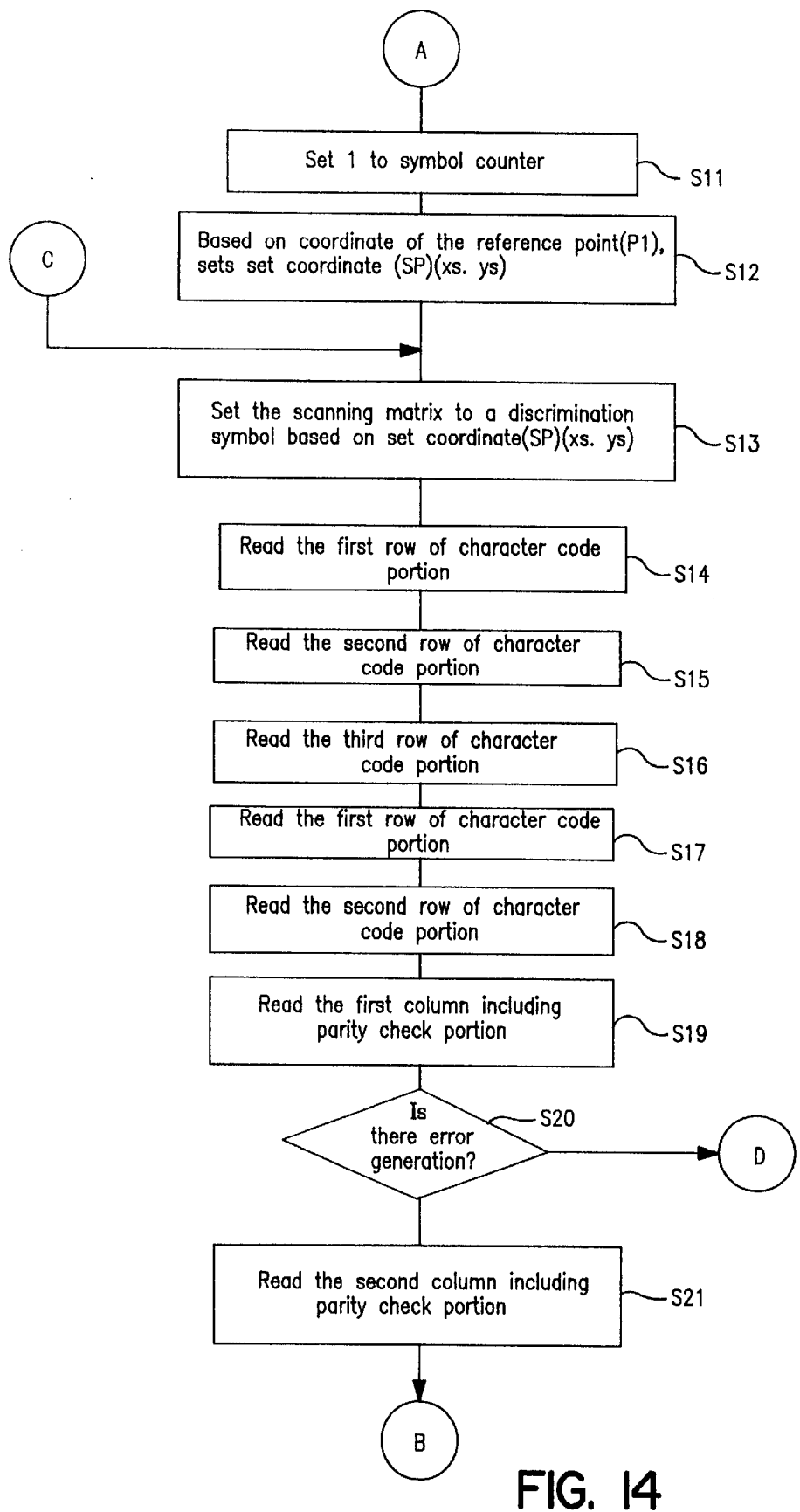
FIG. 14 is a continuation of the flowchart of FIG. 13.
Figure 15:
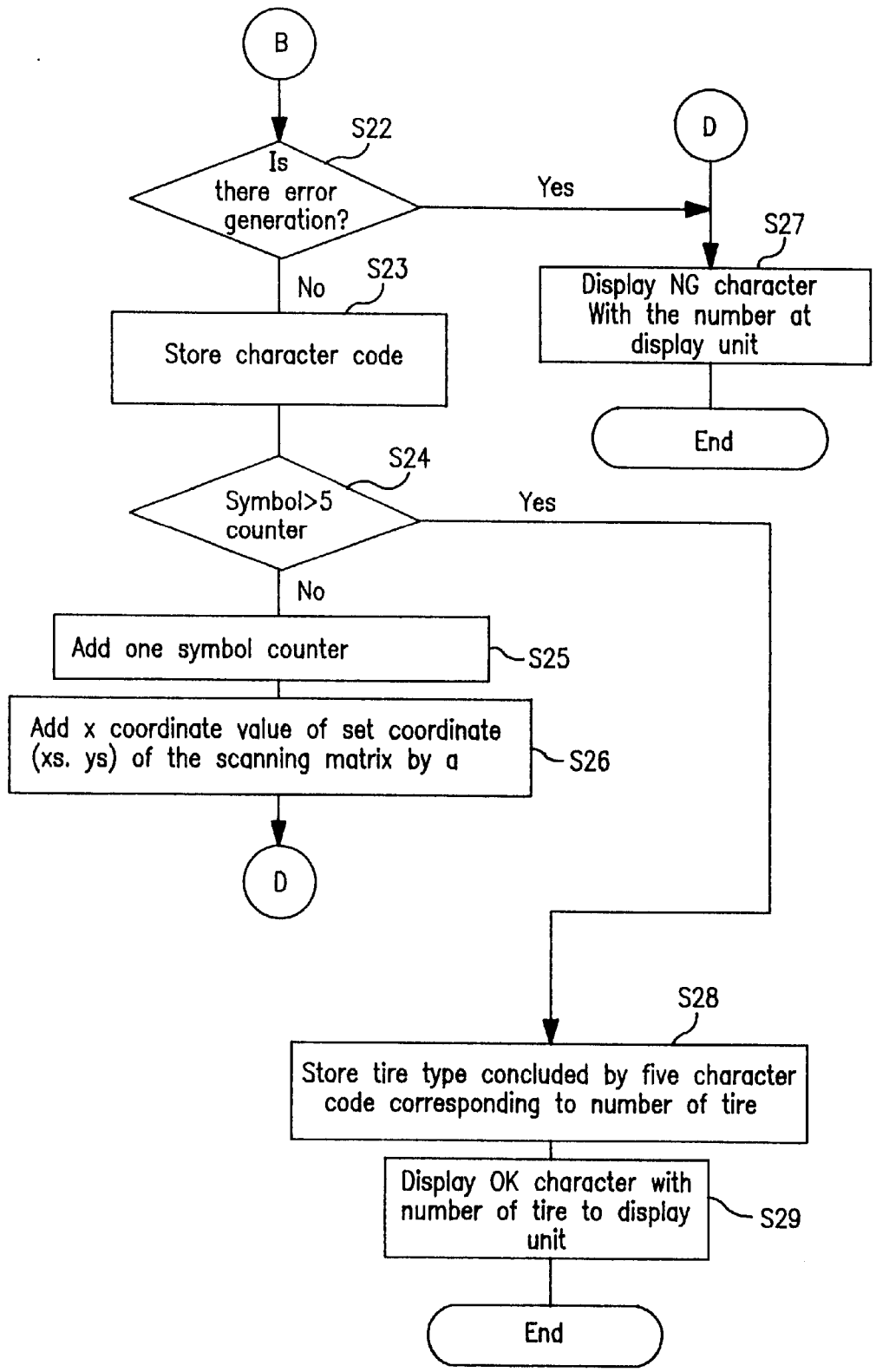
FIG. 15 is a continuation of the flowchart of FIG. 14.

Below, with reference to a flowchart illustrated in FIG. 13 to FIG. 15, the present invention will describe the discrimination processing of tire type performed by the CPU(24). Once discrimination processing of tire type is begun, the CPU(24) discriminates firstly whether a data reception request signal is input from the image processor(22)(step S01). If data reception request signal is not input from the image processor(22), the CPU(24) ends without beginning discrimination processing of the tire type, and below is a reservation status repeated discrimination processing of the step(S01) within a certain processing cycle.

If data reception request signal is input from the image processor(22), the CPU(24) discriminates the step(S01) as true, and receives black and white image data of the mark portion(2) sent from the image processor(22) through the interface(29) and the internal bus(25), then writes it into the frame memory(28)(step S02), and adds one value of tire number count(C1)(step S03). Also, an initial value of tire number count(C1) is 0.

Figure 16:
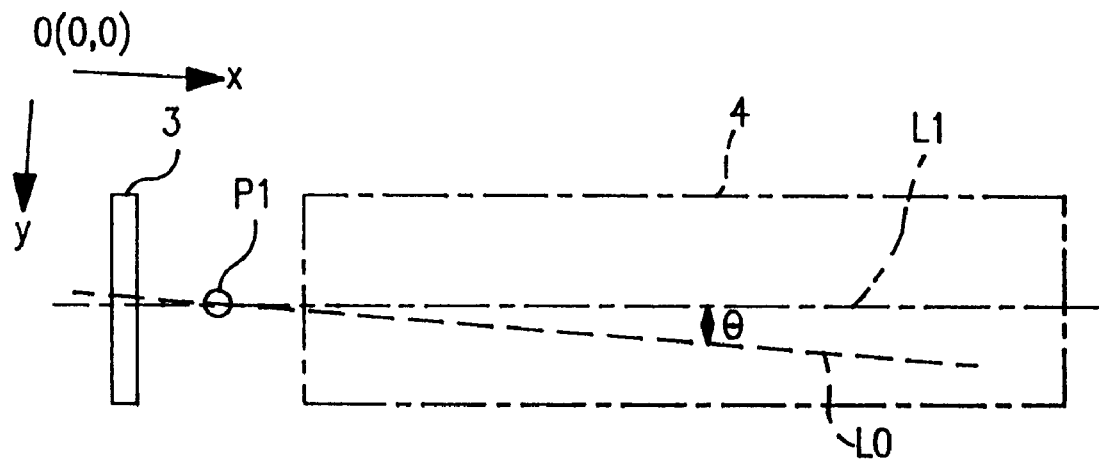
FIG. 16 illustrates a concept of two dimensional black and white image data written in a frame memory of the control portion.

FIG. 16 illustrates a concept of two dimensional black and white image data written in the frame memory(28). In FIG. 16, the dot(0, 0) is an original point of a coordinate of two-divided black and white image data written to the frame memory(28). An x coordinate is set in the horizontal direction and a y coordinate is set in the vertical direction. As shown in FIG. 16, two-divided black and white image data laser mark(3), the reference(P1) and central line(L1) of train of symbols(4) written to the frame memory(28) has an angle of θ in the direction of x coordinate.

Processing of the step(S04) to step(S10) is a process for amending the angle so that the laser mark(3), the reference point(P1), and central line(L1) of train of symbols(4) agree with horizontal line(L0). The CPU(24) searches the laser mark(3) for black and white image data(step S04), and stores central coordinate dot(Q1)(xq, yq) of the laser mark(3)(step S05). Also, the laser mark(3) is the largest black region of black and white image data.

Figure 17:
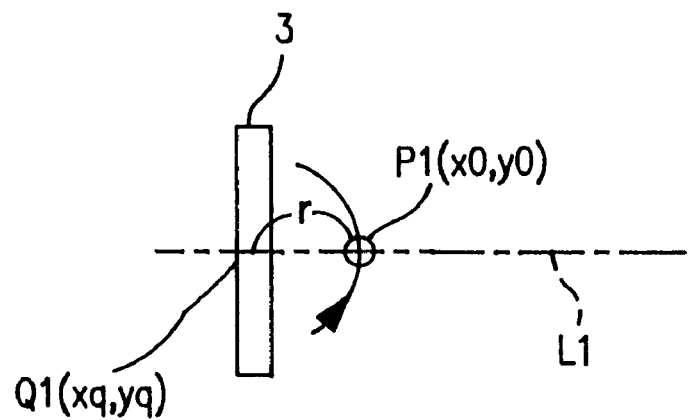
FIG. 17 illustrates a searching of a reference dot(P1) as centering a center coordinate dot(Q1)(xq, yq) of a laser mark.

Next, as shown in FIG. 17, the CPU(24) searches the reference point(P1) by scanning a circumference of certain distance r as center coordinate dot(Q1)(xq, yq) of the laser mark(3)(step S06), and stores the coordinate(P1)(x0, y0) of the reference point(P1)(step S07). Also, in the mark portion (2), a distance between the center of the laser mark(3) and the reference point(P1) is predetermined, and a distance r is a value of image data corresponding to a distance between center of the laser mark(3) and the reference point(P1).

Next, the CPU(24) acquires a straight line(L1) passing through a central coordinate dot(Q1)(xq, yq) of the laser mark(3) and coordinate(x0, x0) of the reference point(P1) (step S08), and acquires angle θ formed by a horizontal line(L0) with a straight line(L1)(step S09), and amends the angle by scrolling black and white image data by angle θ so that a straight line(L1) aligns with a horizontal line(L0) as center of the reference point(P1)(step S10).

After the CPU(24) performs the processing step(S10), existence of each of the discrimination symbols(5a~5e) dot in black and white image data by processing the step(S11) to step(S29) is recognized, and a character code by arrangement of a length and breadth dot of the character code portion(7) of the discrimination symbols(5) is decoded, then truth and falsity of a decoding result of the character code decoded by arrangement of dot which is the parity check portion(8) of the discrimination symbols(5) is discriminated.

Figure 18:
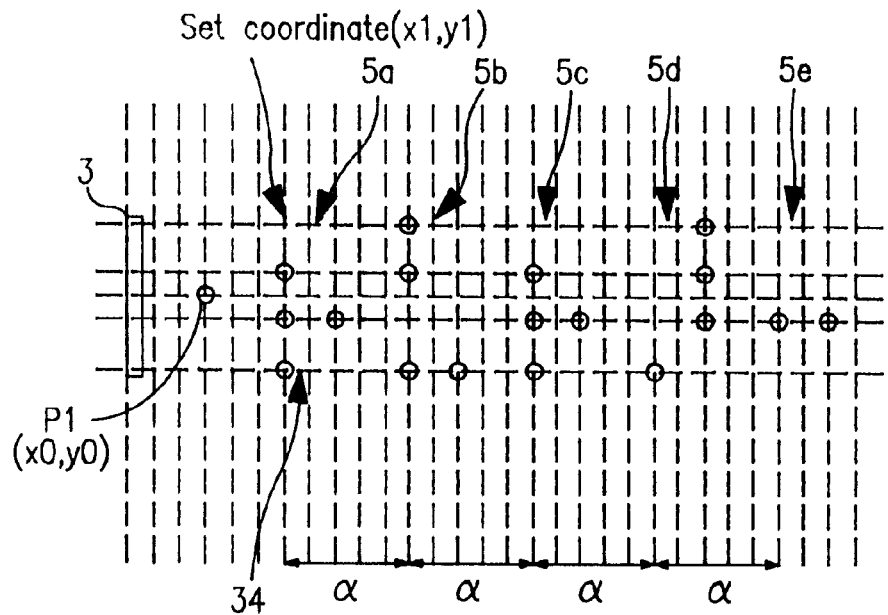
FIG. 18 illustrates a concept of the two dimensional black and white image data after an angle is amended.

FIG. 18 illustrates a concept of two dimensional black and white image data after the angle is amended. As shown in FIG. 18, because position relationship between the reference point(P1) in the mark portion(2) and arrangement position (A11) of dot of one first in the first column of the first discrimination symbol(5a)(see FIG. 4) is predetermined, once the reference point(P1)(x0, y0) on black and white image data is acquired, a coordinate of arrangement position (A11) of dot of first row in the first column of the first discrimination symbol(5a) is acquired automatically. Also, an interval per first row of the discrimination symbols (5a~5e) of black and white image data is α, respectively.

The CPU(24) moved on the step(S11) sets an initial value(1) to a symbol count(C2) corresponding to the first discrimination symbol(5a)(step S11), and sets the coordinate (x1, y1) of the arrangement position(A11) of first row in first column of the first discrimination symbol(5a) acquired based on the coordinate(x0, y0) of the reference point(P1) to set coordinate(SP)(xs, ys) of the scanning matrix(34) as shown in drawing(step S12), then sets the scanning matrix (34) to a discrimination symbol based on the set coordinate (SP)(xs, ys)(step S13). Also, the scanning matrix(34) sets scanning position for one of the discrimination symbols(5) as shown in FIG. 5, and it is prestored in the ROM(26).

The CPU(24) reads a character code marked according to each dot existing in the character code portion(7) by reading the method described above with reference to FIG. 4 and FIG. 5, performing in sequence each processing of the step(S14) to step(S18). Then, the first column of the discrimination symbols(5) comprising the parity check porion(8)(step S19) is read, and discriminates whether error is generated in decoding result of decoded character code(step S20).

Now, for example, the present invention will describe the situation of character "C" marked at the discrimination symbol(5a) illustrated in FIG. 4. If a decoding result of a decoded character code is normal, as described above a reading result of the first column of the discrimination symbols(5) comprising the parity check portion(8) is an odd parity, and is 3 in this case.

Figure 19:
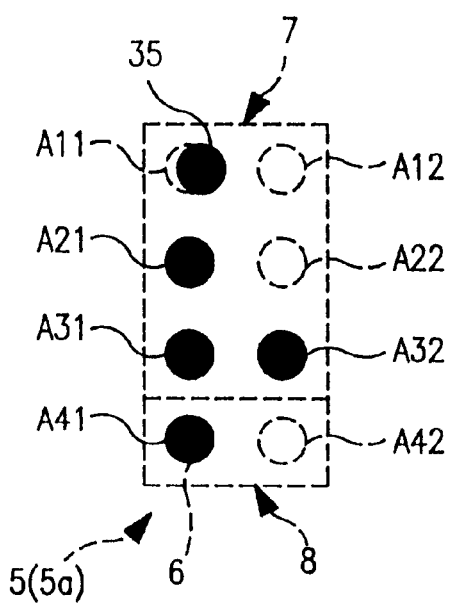
FIG. 19 illustrates said discrimination symbols resulting in error generation due to dust attachment.

FIG. 19 illustrates the discrimination symbols resulting in error generation due to attachment of dust. But, as shown in FIG. 19, if dust is attached near the region of the arrangement position(A11), it is recognized as a dot(6) because it is expressed as a black color on a black and white image data. Thus, reading result of the first column of the discrimination symbols(5) comprising the parity check portion(8) is 4, and since it is not odd parity, it is possible to detect an error of decoded result. Namely, error is generated.

If an error does not occur in an error generation in discrimination processing of the step(S20), the CPU(24) reads the second column of the discrimination symbols(5) comprising the parity check portion(8)(step S21), and similarly, discriminates whether error is generated in decoding result of decoded character code by discriminating if a reading result is an odd parity(step S22).

If either step(S20) or step(S22) is discriminated as error generation, the CPU(24) performs the step(S27), and outputs/displays a present value of tire number count(C1), namely tire number with NG character at the display unit (32)(step S27), then ends discrimination processing of tire type.

Also, if NG is marked, a worker stops driving the circle portion of tire(10), and removes the tire(1) from the circle portion of tire(10) and removes dust from the mark port ion(2). Then, it is good for a person man to read a character code, and to enter again by retrying an entrance side of the circle portion of tire(10).

If it is not error generation by discrimination processing of the step(S14), the CPU(24) stores a character code acquired according to processing of the step(S14) or step (S1S)(step S23), and discriminates whether present value of symbol count(C2) amounts to 5(step S24). In case of present embodiment, because the number of discrimination symbols is 5, if the number of discrimination symbols which is a decoding arm does not amount to 5, the CPU(24) performs the step(S25). Also, in this case, discrimination symbol results in decoding arm.

The CPU(24) carried to step(S25), adds the value of symbol count(C2) by one(step S25), and adds x coordinate value of set coordinate(xs, ys) of the scanning matrix(34), wherein only α is added to illustrate it in FIG. 18(step S26).

Return to the step(S13) again, and the scanning matrix(34) to the next discrimination symbol(5) based on set coordinate (xs, ys) of the scanning matrix(34) are set.

Below, if either discrimination processing of the step (S20) or step(S22) is not discriminated to error generation, until amounting to 5 of count value of symbol count(C2), the processing loop formed according to the step(S14) to step (S26) is performed repeatedly, and the discrimination symbols(5b~5e) are decoded in sequence. The whether error is generated in decoding result of decoded character code is discriminated. If decoded result is true, the character code is stored and the value of symbol count(C2) is updated by adding one, and set coordinate(xs, ys) according to position of the next discrimination symbol is raised.

Further, if a decoding of the fifth discrimination symbol (5e) ends with the result is normal, discrimination result of the step(S24) is true, and the CPU(24) stores tire(1) type concluded by sequence of five character code ended decoding, corresponding to tire nmuber(step S28), then outputs/displays OK character with number of tire to the display unit(32), and ends type discrimination processing. As described above, type discrimination for tire ends.

Also, during performing a processing loop repeatedly formed according to the step(S20) to step(S26), if either discrimination processing of the step(S20) or step(S22) is discriminated to error generation, as similarly above, the CPU(24) performs the step(S27), and outputs/displays NG character with tire number to the display unit(32), then ends discrimination processing of tire type.

Also, returning to FIG. 10 and FIG. 11, if discrimination of the tire(1) type ends, rotation of the tire(1) is stopped by stopping drive of the first drive roller conveyor(16) and the second drive roller conveyor(17). Then, by driving drive arm(not Ilustrated), the second stopper(20) and guide rollers (21, 21) retreat from transfer face of the first drive roller conveyor(16) and the second drive roller conveyor(17). Also, the first drive roller conveyor(16) and the second drive roller conveyor(17) are driven, and as in FIG. 1, perform rotation drive for the transfer in the direction of arrow A and the tire(1) exits from the left side of the circle portion of tire(10).

Also, after the tire(1) which ends discrimination of type exits from the circle portion of tire(10) and next tire(1) which is not undergoing discrimination of type arrives at entrance side of the circle portion of tire(10), then the stopper(19) is down again and the tire(1) enters.

As described above, according to method for discriminating tire type of the present invention, it is correct to use a dot code as train of symbols indicating class of tire; moreover because dust is attached to a position which did not exist originally and thus this dust is recognized as a dot, if decoding is erroneous, it is possible to detect error of decoding, which can improve discrimination grade of a tire class.

According to a method for discriminating tire type of the present invention, it is correct to use a dot code as train of symbols indicating class of tire, moreover because dust is attached to a position which did not exist originally and thus this dust is recognized as a dot, if decoding is erroneous, it is possible to detect error of decoding, which can improve discrimination grade of a tire class.

We claim:

1. A method for discriminating a tire class and discriminating tire type based on a train of symbols installed in a side of the tire comprising:

a train of symbols which are composed of a multiple arrangement of discrimination symbols, and the discrimination symbols are composed of chararcter code portion that is indicated according to existence of a length and breadth, and a parity check porion that indicates truth and falsity of said character code portion with existence of multiple dots; wherein a CCD camera photographs the train of symbols, and the train of symbols in the photograph are made of two dimensional image data; according to a control unit, the existence of each of the discrimination symbols dot at said train of symbols of said image data is recognized, and the character code is decoded due to length and breadth arrangement of the character code portion of discrimination symbols, an simultaneously the truth and falsity of decoded result of the character code, which is decoded by arrangement of the parity check portion dot of said discrimination symbols, is judged.

* * * * *